United States Patent
Nakao et al.

(10) Patent No.: US 8,112,222 B2
(45) Date of Patent: Feb. 7, 2012

(54) LANE DETERMINING DEVICE, METHOD, AND PROGRAM

(75) Inventors: Koichi Nakao, Okazaki (JP); Masaki Nakamura, Okazaki (JP); Motohiro Nakamura, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 543 days.

(21) Appl. No.: 12/068,807

(22) Filed: Feb. 12, 2008

(65) Prior Publication Data

US 2008/0208460 A1  Aug. 28, 2008

(30) Foreign Application Priority Data

Feb. 13, 2007  (JP) ................... 2007-032352

(51) Int. Cl.
*G05D 1/02* (2006.01)

(52) U.S. Cl. ........ 701/300; 382/104; 382/276; 340/933; 340/435; 701/200; 701/213; 701/214; 701/225

(58) Field of Classification Search .................. 701/300, 701/214, 225, 213; 340/933, 435; 382/104, 382/276

See application file for complete search history.

(56) References Cited

U.S. PATENT DOCUMENTS

| | | | |
|---|---|---|---|
| 6,577,334 B1 * | 6/2003 | Kawai et al. .................. | 348/148 |
| 7,668,341 B2 * | 2/2010 | Miyajima et al. ............. | 382/104 |
| 2001/0056326 A1 * | 12/2001 | Kimura ........................ | 701/208 |
| 2009/0024320 A1 * | 1/2009 | Nakamura et al. ............ | 701/210 |

FOREIGN PATENT DOCUMENTS

| | | |
|---|---|---|
| EP | 1 605 404 | 12/2005 |
| EP | 1 674 827 | 6/2006 |
| JP | A-11-072337 | 3/1999 |
| JP | A 2000-105898 | 4/2000 |
| JP | A-2007-003286 | 1/2007 |

OTHER PUBLICATIONS

Japanese Patent Office, Notification of Reason(s) for Refusal mailed May 6, 2011 in Japanese Patent Application No. 2007-032352 w/Partial English-language Translation.

\* cited by examiner

*Primary Examiner* — Jack W Keith
*Assistant Examiner* — Adam Tissot
(74) *Attorney, Agent, or Firm* — Oliff & Berridge, PLC (57) ABSTRACT

Devices, methods, and programs obtain vehicle position information indicating a current position of a vehicle, and based on the vehicle position information, obtain road information including positions and forms of lane markings around the current position of the vehicle. Based on the road information, the devices, systems, and methods determine whether a branch point exists on the road in a forward direction of the vehicle. If a branch point exists, the devices, methods, and programs obtain image information of an area before the branch point, and determine whether no lane marking is imaged or is partly imaged in the image information of the area before the branch point. If there is no lane marking or only a partial lane marking imaged in the area before the branch point, the devices, methods, and programs obtain image information of the branch point including a captured image of a lane marking, and determine a lane in which the vehicle is traveling after the branch point based on an imaging order of the lane marking, a form of the lane marking, a position of the lane marking in the image information of the branch point, and the road information.

13 Claims, 9 Drawing Sheets

LANE DETERMINING DEVICE, METHOD, AND PROGRAM

INCORPORATION BY REFERENCE

The disclosure of Japanese Patent Application No. 2007-032352, filed on Feb. 13, 2007, including the specification, drawings and abstract is incorporated herein by reference in its entirety.

BACKGROUND

1. Related Technical Fields

Related technical fields include devices, methods, and programs that recognize a lane on which a vehicle is traveling, for example, by using image information including a captured image of at least a lane marking around the vehicle.

2. Related Art

Japanese Patent Application Publication No. JP-A2000-105898 (pages 21-22, FIGS. 24, 25) discloses an on-vehicle navigation apparatus that recognizes the position of a vehicle by using a camera mounted on the vehicle. The apparatus includes a camera capturing an image of a surface of a forward area of a road where the vehicle is traveling. The apparatus detects changes in width of lane markings (white lines) marked on the road surface. The apparatus determines that the vehicle is traveling on a right branch when the width of the white line on the left of the vehicle increases, and determines that the vehicle is traveling on a left branch when the width of the right white line increases. In this manner, the apparatus is capable of determining the branch that the vehicle is traveling after passing through a branch point. Further, when the branch determination has a specific cycle, the apparatus determines whether each of the white lines on the right and left of the vehicle is a dashed line or a solid line. Thereby, the apparatus is capable of determining on which lane the vehicle is traveling. The apparatus is further capable of determining whether the vehicle has changed lanes, according to a certain distance movement of the white lines in the right or left direction relative to the vehicle.

Based on the travel information obtained by these determinations, the position of the vehicle can be specified even when the vehicle has passed through a branch point or the like, and based on the specified position of the vehicle, the vehicle can be properly controlled.

SUMMARY

In order to obtain the accurate position of a vehicle a navigation apparatus, it is generally beneficial if a road or a lane where the vehicle is traveling can be recognized immediately even after the vehicle passes through a branch point. However, if the branch point is a narrow-angle branch point and thus an angle made by a lane where the vehicle is traveling after passing through the branch point and another road or lane is small, a travel state immediately after the branch is not greatly different from a travel state which would be recognized if the vehicle had taken the other road or lane. Because of this, information from a conventional GPS (Global Positioning System), gyro sensor, G sensor, and vehicle speed sensor, does not allow the immediate recognition of which of the branch roads the vehicle is traveling after passing through the branch point.

Further, Japanese Patent Application Publication No. JP-A2000-105898 detects the travel information of the vehicle by obtaining the information regarding the lane markings marked on the road surface of the lane where the vehicle is traveling, and therefore, if, for example, there is no lane marking before the position where the narrow-angle branch point exists, the travel information of the vehicle cannot be detected, which poses a problem that it is difficult to recognize the position of the vehicle immediately after the vehicle passes through the narrow-angle branch point.

Various exemplary implementations of the broad principles described herein are capable of quickly determining on which lane the vehicle is traveling after passing through a branch point of a road even if no lane marking as a basis of the recognition of the lane exists before the branch point.

Various exemplary implementations provide devices, methods, and programs that obtain vehicle position information indicating a current position of a vehicle, and based on the vehicle position information, obtain road information including positions and forms of lane markings around the current position of the vehicle. Based on the road information, the devices, systems, and methods determine whether a branch point exists on the road in a forward direction of the vehicle. If a branch point exists, the devices, methods, and programs obtain image information of an area before the branch point, and determine whether no lane marking is imaged or is partly imaged in the image information of the area before the branch point. If there is no lane marking or only a partial lane marking imaged in the area before the branch point, the devices, methods, and programs obtain image information of the branch point including a captured image of a lane marking, and determine a lane in which the vehicle is traveling after the branch point based on an imaging order of the lane marking, a form of the lane marking, a position of the lane marking in the image information of the branch point, and the road information.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
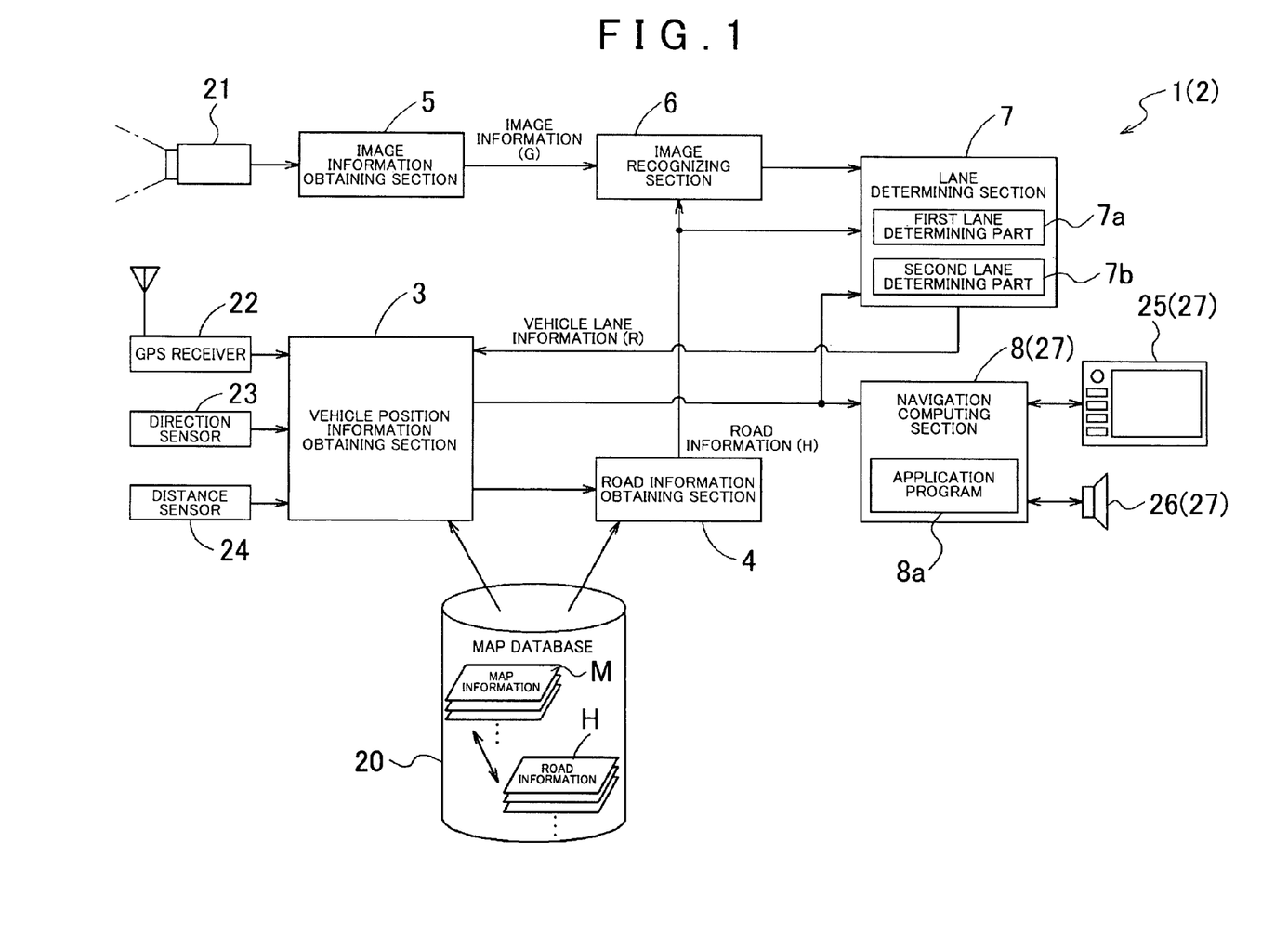
FIG. 1 is a block diagram schematically showing an exemplary navigation apparatus including a lane determining device.

FIG. 1 is a block diagram schematically showing the configuration of an exemplary navigation apparatus 1 including a lane determining device 2. The lane determining device 2 is capable of determining a vehicle lane (a road lane on which a vehicle C is traveling), based on results of image recognition of lane markings included in obtained image information G (see FIG. 3, FIG. 4, and FIG. 7) and based on road information H obtained from a map database 20. Such lane markings may include solid or dashed lines, or the like, provided as traffic lane border lines on both sides of the lane.

Figure 5:
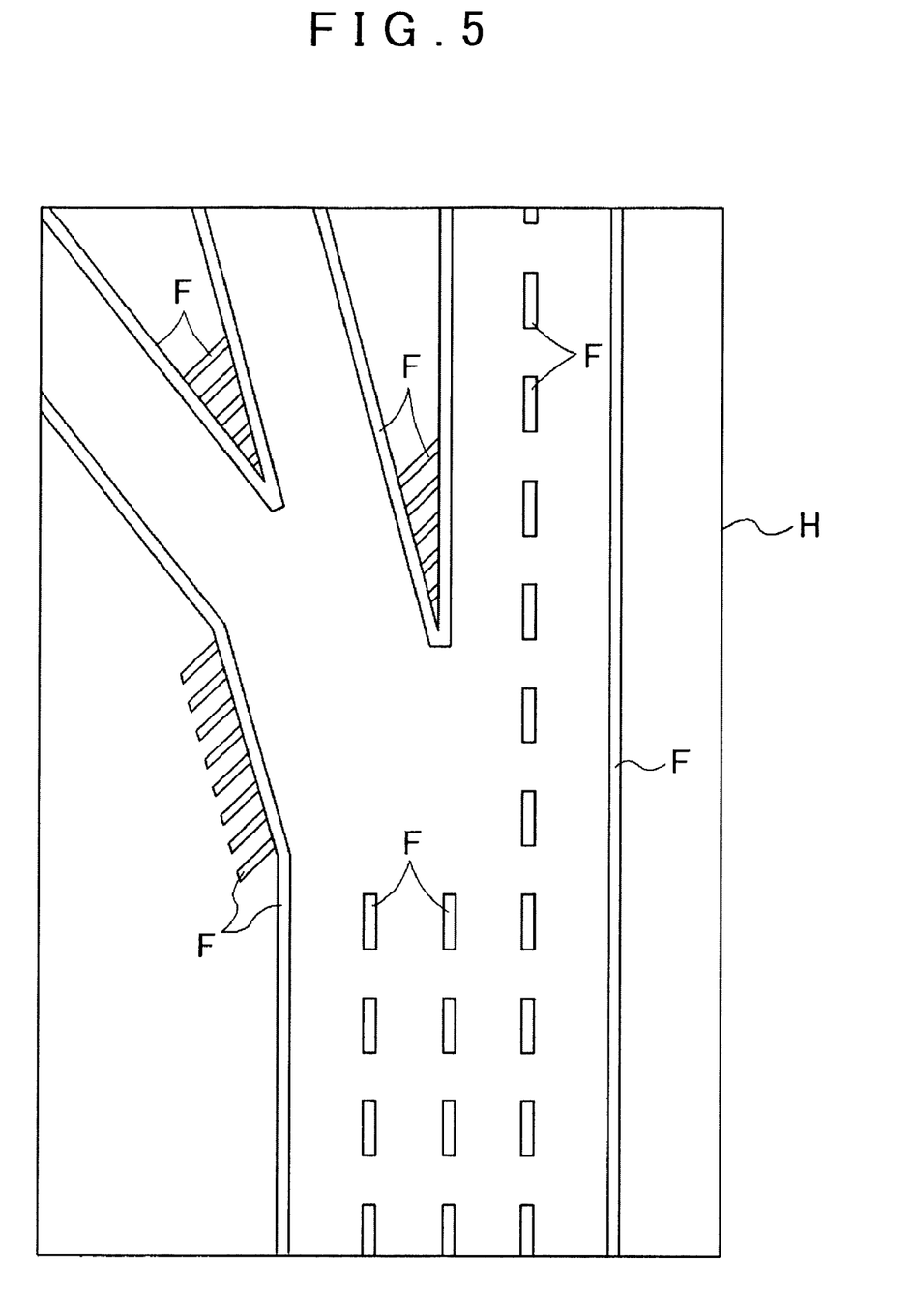
FIG. 5 is a view showing exemplary road information including feature information of features near a narrow-angle branch point.

Further, even immediately after the vehicle C passes through a branch point (see FIG. 5, FIG. 6, and so on) when the above lane determination using the image recognition results is difficult, the lane determining device 2 is capable of quickly determining the vehicle lane on which the vehicle C is traveling, by using results of image recognition of specific lane markings. The navigation apparatus 1 may perform predetermined navigation operations by referring to map information M obtained from the map database 20 and vehicle lane information R that is determined as a result of the lane determination by the lane determining device 2.

Figure 6:
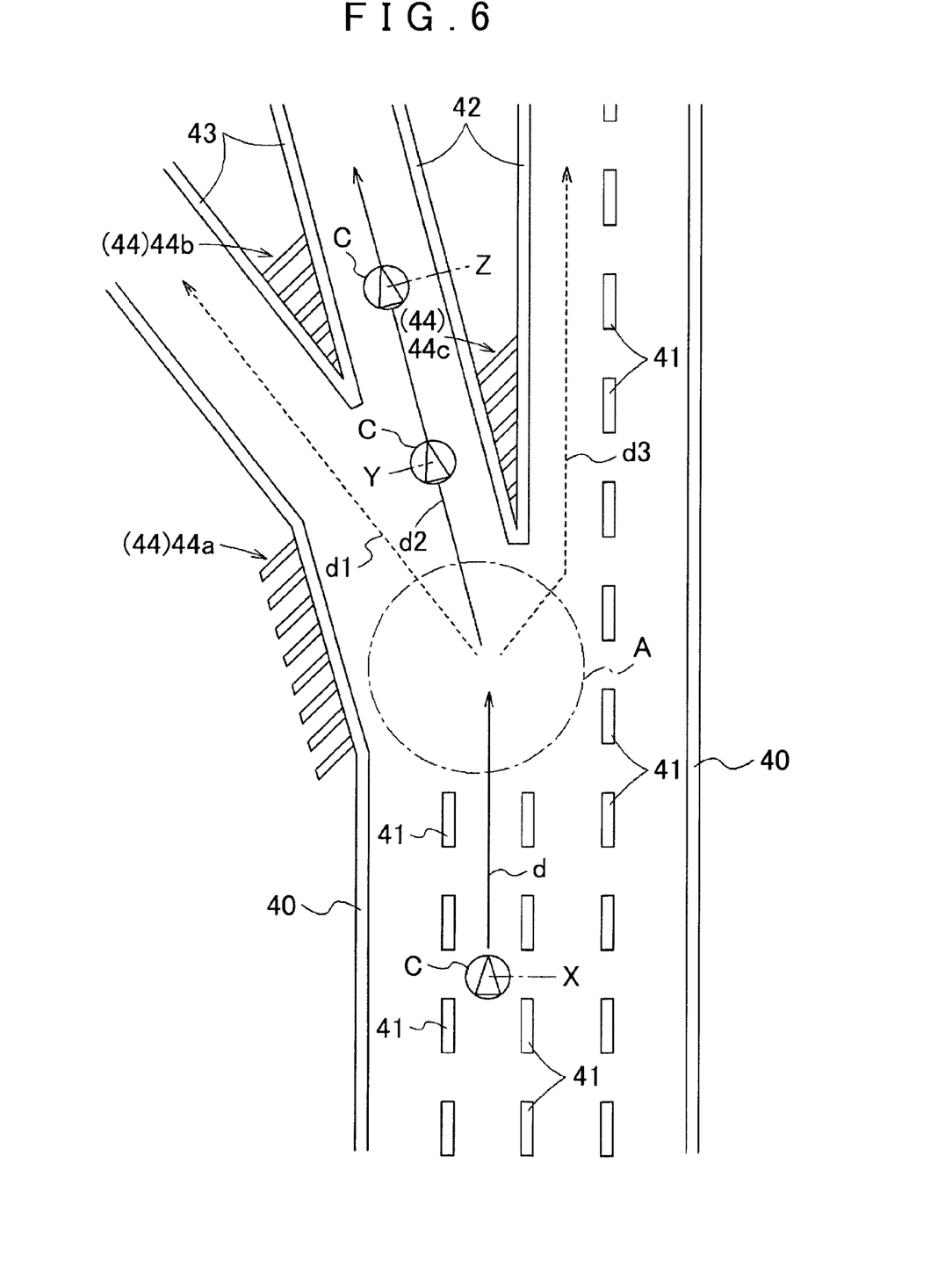
FIG. 6 is a view showing an example of a narrow-angle branch point where lane markings with zebra zones are provided.

Here, "lane markings" refer to solid or dashed white lines, yellow lines, and the like marked as border lines of the traffic lane on both sides or one side of the lane. The solid lines 40, 42, 43, dashed lines 41, and so on, shown in FIG. 6, are examples of such lane markings.

The concept of the lane markings includes specific lane markings. In the following examples, "specific lane markings" refer to specific types of lane markings that are targets of image recognition in imaging order-based lane determination. Lane markings having characteristic shapes such as a lane marking with a zebra zone 44 and a lane marking with a deceleration zone 45 are examples of the "specific lane markings." In the following examples, "branch point" refers to a point where two roads or more meet so that the vehicle can advance in at least two directions, and includes a narrow-angle branch point, an intersection, and the like. In the following examples, "narrow-angle branch point" refers to a branch point where conventional independent navigation using a GPS (Global Positioning System), a gyro sensor such as a yaw rate sensor, a G sensor, a vehicle speed sensor, and the like may have difficulty in determining in which direction the vehicle is advancing from the branch point, due to the configuration of the branch point (e.g., there is a narrow angle between the directions of two of the roads that meet at the branch point). In the following examples, "lane" means a traffic lane as well as branching roads connecting to a branch point.

As shown in FIG. 1, the navigation apparatus may, physically, functionally, and/or conceptually include, a vehicle position information obtaining section 3, a road information obtaining section 4, an image information obtaining section 5, an image recognizing section 6, a lane determining section 7, and a navigation computing section 8. Such sections may be implemented by applying various kinds of processing to input data, using hardware and/or software in a processor such as a CPU (controller). The navigation apparatus may include a map database 20 including, a device having a recording medium (memory) capable of recording information and its driving unit, such as, for example, a hard disk drive, a DVD drive including a DVD-ROM, or a CD drive including a CD-ROM. Hereinafter, the structures of the sections of the navigation apparatus 1 according to this embodiment will be described in detail.

Figure 2:
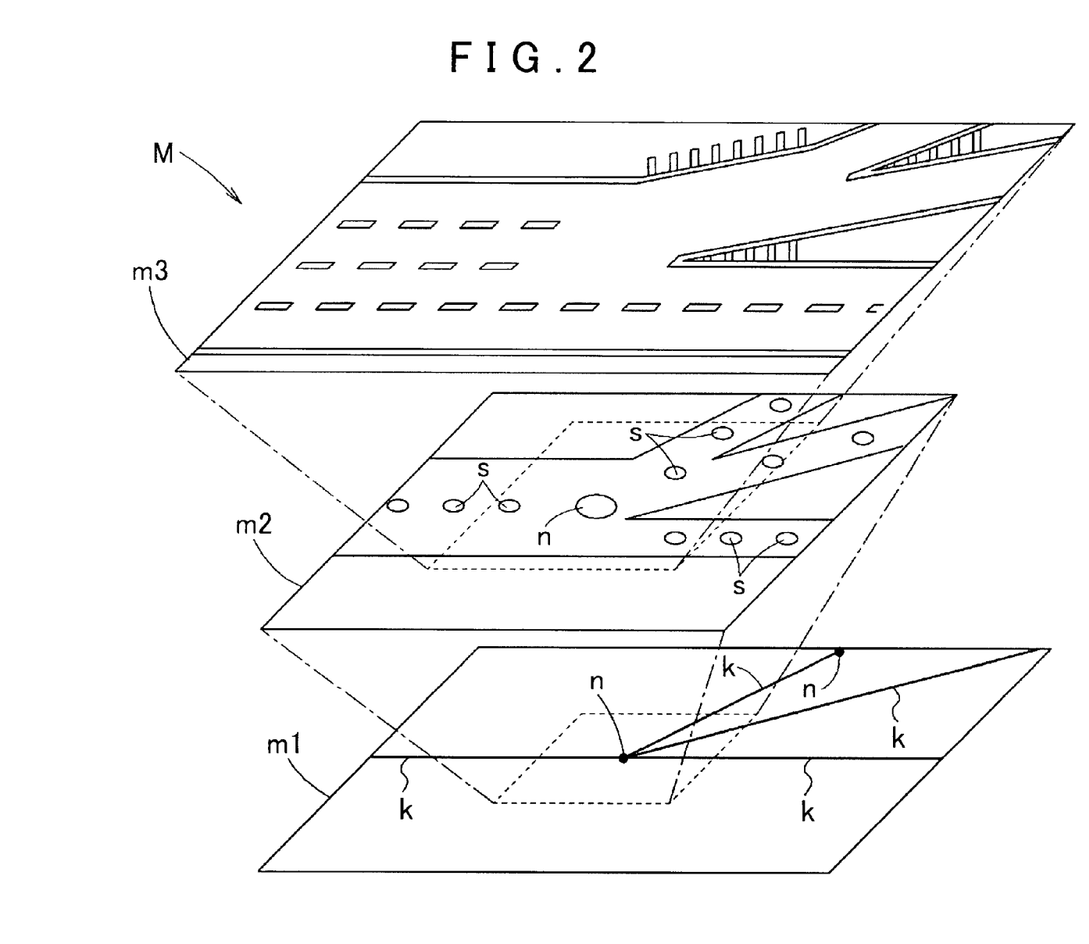
FIG. 2 is a view showing the structure of exemplary map information and road information stored in a map database.

The map database 20 may store a plurality of pieces of the map information M, which are classified on a predetermined area basis, and pieces of road information H respectively corresponding to these pieces of the map information M. FIG. 2 is an explanatory view showing an example of the structure of the map information M and the road information H that are stored in the map database 20. As shown in FIG. 2, the map database 20 may store a road network layer m1, a road shape layer m2, and a road information layer m3. In this example, pieces of information stored in these layers m1 to m3 respectively form the map information M, and among them, the information stored in the road information layer m3 forms the road information H.

The road network information m1 includes inter-road connection information. Specifically, the road network information m1 may include: information on a large number of nodes n having map position information expressed by longitude and latitude, and information on a large number of links k each linking two nodes n to form a road. Further, each of the links k may have, as its link information, information on the road type (type such as an expressway, a toll road, a national road, a prefecture road, or the like), the length, and the like of the link. The road shape layer m2 is stored in correspondence to the road network layer m1 and shows the shape of each road. Specifically, the road shape layer m2 may include information on shape interpolation points s which are disposed between the two nodes n (on the link k) and indicate a detailed shape of each of the links k, information on a road width at each of the shape interpolation points s for showing a detailed shape of each road, and so on.

The road information layer m3 is formed in correspondence to the road network layer m1 and the road shape layer m2 and stores detailed information on each road. Examples of the information stored in the road information layer m3 are information on each branch point (a narrow-angle branch point and the like), lane information regarding each road, feature information F regarding various kinds of features (lane markings and the like) provided on each road or around each road, and so on. Here, the lane information may include information on the number of lanes of each road and lane width of each lane. The lane information may further include information on a positional relation of each lane in a plurality of roads branching off and connecting at the branch point and a connection relation of these roads (link angle, substantially straight connection, and so on), and so on.

The feature information F includes position information and form information regarding each feature. Here, the position information may have information on the position of a representative point of each feature on a map (longitude and latitude) and the direction of each feature. The form information has information on the shape, size, color, and the like of each feature. In addition to these pieces of information, the feature information F includes type information indicating the type of each feature, and so on. Features shown by the feature information F may include road markings (e.g., painted markings) provided on a road surface. Examples of the features relating to the road markings include lane markings (various kinds of lane markings such as a solid line, a dashed line, a dual line, a lane marking with a zebra zone (striped), and a lane marking with a deceleration zone) provided along a road to demarcate each lane, traffic direction signs designating a traffic direction of each lane (various arrows such as a straight-ahead arrow, a right-turn arrow, and a left-turn arrow), a pedestrian crossing, a stop line, a speed indication, and the like. Note that the features corresponding for which the feature information F is stored may also include various features such as a traffic signal, a traffic sign, an overpass, a tunnel, and the like, in addition to the above road markings.

The road information H includes the feature information F such as the position information, the form information, and so on regarding the lane markings. In this example, among these pieces of the road information H, the road information H regarding lane markings as traffic lane border lines marked on both sides or one side of the traffic lane and, in particular, the road information H regarding the specific lane markings are used. Further, the road information H regarding a branch point, in particular, the road information H regarding a narrow-angle branch point is used.

The vehicle position information obtaining section 3 functions as a vehicle position information obtaining unit obtaining vehicle position information S indicating a current position of the vehicle C. Here, the vehicle position obtaining section 3 is connected to a GPS receiver 22, a direction sensor 23, and a distance sensor 24. The GPS receiver 22 receives GPS signals from a GPS (Global Positioning System) satellite. The GPS signal is normally received every one second and is output to the vehicle position information obtaining section 3. The vehicle position information obtaining section 3 analyses the signals received by the GPS receiver 22 from the GPS satellite, thereby being capable of obtaining information regarding a current position (longitude and latitude), a travel direction, a moving speed, and the like of the vehicle C.

The direction sensor 23 detects the travel direction of the vehicle C or a change in the travel direction. For example, the direction sensor 23 may be formed by a gyro sensor, a geomagnetic sensor, an optical rotation sensor or a rotation-type resistance sensor attached to a rotating portion of a steering handle, an angle sensor attached to a wheel portion, or the like. The direction sensor 23 outputs its detection result to the vehicle position information obtaining section 3. The distance sensor 24 detects a speed and a moving distance of the vehicle C. For example, the distance sensor 24 may be formed by a vehicle speed pulse sensor outputting a pulse signal every predetermined rotation amount of a drive shaft, a wheel, or the like of the vehicle C, a yaw/G sensor detecting acceleration of the vehicle C, a circuit integrating the detected acceleration, and so on. The distance sensor 24 outputs information on the vehicle speed and the moving distance, which are its detection results, to the vehicle position information obtaining section 3.

The vehicle position information obtaining section 3 performs calculations for locating the vehicle C by using a generally known method based on the outputs from the GPS receiver 22, the direction sensor 23, and the distance sensor 24. Further, the vehicle position information obtaining section 3 obtains, from the map database 20, the map information M regarding the vicinity of the vehicle position, and based on the map information M, performs correction for matching the vehicle position on a road shown in the map information M by generally known map matching. In this manner, the vehicle position information obtaining section 3 obtains the vehicle position information S including the information on the current position of the vehicle C (e.g., expressed by longitude and latitude), and the information on the travel direction of the vehicle C. The obtained vehicle position information S includes an error ascribable to detection accuracy and the like of each of the sensors 22 to 24.

Further, even with the vehicle position information S thus obtained, a vehicle lane which is a lane on which the vehicle C is traveling cannot be specified if a road where the vehicle C is traveling has a plurality of lanes. Therefore, the navigation apparatus 1 according to this embodiment is structured so that the vehicle lane is determined by the later-described lane determining section 7. The vehicle position information S obtained by the vehicle position information obtaining section 3 is output to the road information obtaining section 4, the lane determining section 7, and the navigation computing section 8.

The road information obtaining section 4 obtains necessary parts of the map information M and the feature information H including the feature information F from the map database 20 based on the vehicle position information S and so on obtained by the vehicle position information obtaining section 3. Specifically, the road information obtaining section 4 may obtain the road information H including the feature information F regarding features (lane markings and the like) which will be targets of image recognition processing by the image recognizing section 6, to output the obtained information to the image recognizing section 6.

Further, the road information obtaining section 4 may obtain the road information H regarding the vicinity of the vehicle position for use in the vehicle lane determination by the lane determining section 7, and then may output the obtained information to the lane determining section 7. The road information obtaining section 4 may obtain, from the map database 20, the map information M regarding an area requested by the navigation computing section 8 for use in the navigation processing by the navigation computing section 8, and may output the obtained information to the navigation computing section 8. Here, the road information H regarding the vicinity of the vehicle position obtained by the road information obtaining section 4 to be output to the lane determining section 7 may include information on lane markings (including specific lane markings) provided on the road where the vehicle C is traveling (see FIGS. 5 and 8), information regarding a branch point (especially, a narrow-angle branch point) present in the forward direction of the vehicle C, information on the number of lanes and widths of the lanes of the road, and so on.

The image information obtaining section 5 obtains image information G (see FIGS. 3, 4, and 7) regarding the vicinity of the vehicle position imaged by an imaging device 21. Here, the imaging device 21 may be a camera or the like including an image sensor, and may be provided at a position where it is capable of capturing images of the lane markings (including the specific lane markings) on the road at least in the vicinity of the vehicle C. As such an imaging device 21, a back camera or the like may be suitably used.

Figure 3:
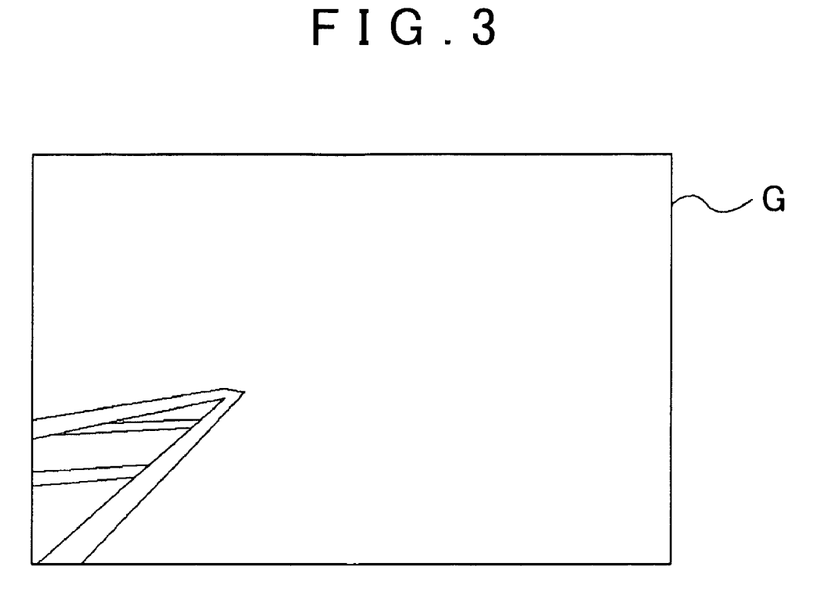
FIG. 3 is a view showing an example of image information of an area behind a vehicle equipped with the navigation apparatus when the vehicle is at a Y point in FIG. 6.
Figure 4:
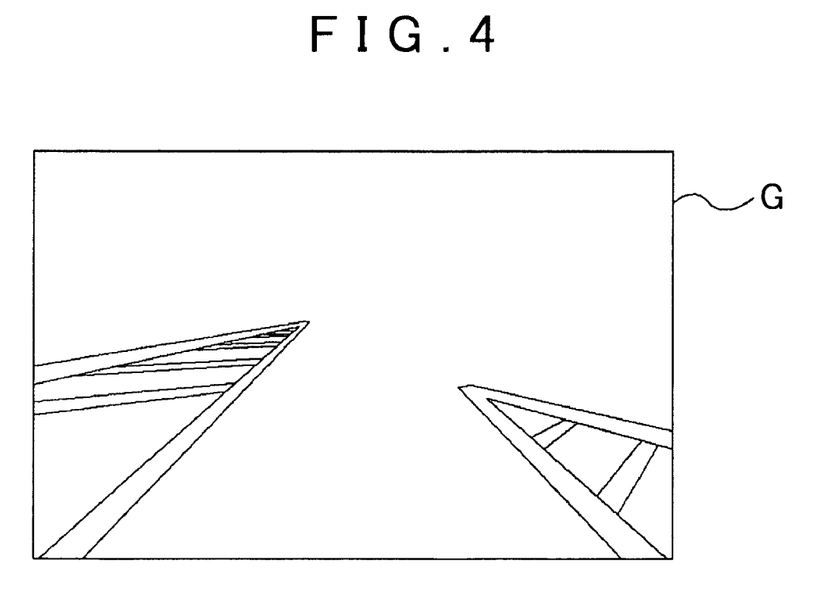
FIG. 4 is a view showing an example of image information of an area behind the vehicle when the vehicle is at a Z point in FIG. 6.

FIG. 3 shows image information G captured by the back camera from a point Y in FIG. 6, and FIG. 4 shows the image information G captured by the back camera from a point Z in FIG. 6. The image information obtaining section 5 may receive analog image information captured by the imaging device 21 at predetermined time intervals and converts the analog image information into a digital signal to obtain the image information G. The time interval for receiving the image information G at this time may be set between about 10 ms to about 50 ms, for example. Consequently, the image information obtaining section 5 is capable of continuously obtaining a plurality of frames of the image information G captured by the imaging device 21. The obtained plural frames of the image information G may be output to the image recognizing section 6.

The image recognizing section 6 performs image recognition processing on the image information G (see FIGS. 3, 4, and 7) obtained by the image information obtaining section 5. In this example, the image recognizing section 6 may perform the image recognition processing of the lane markings (including the specific lane markings) as road markings provided on a surface of the road, by using the road information H obtained by the road information obtaining section 4. Specifically, the image recognizing section 6 may perform binarization processing, edge detection processing, and so on the obtained image information G to extract contour information of the features (lane markings) included in the image information G. Thereafter, the image recognizing section 6 may extract lane markings having the contour information matching the forms shown by the form information, based on the form information of the lane markings included in the road information H obtained by the road information obtaining section 4. When extracting the lane markings having the contour information matching the form information, the image recognizing section 6 may calculate positional relationships between the vehicle C and the lane markings and may output information on the imaging order of the lane markings, information on the types of the lane markings, and information on the positional relationships with the vehicle C, as image recognition results to the lane determining section 7.

The positional relations between the vehicle C and the lane markings in the image information G can be calculated based on the positions of the lane markings in the image information G and based on information indicating a relation between the vehicle position and each of the positions in the image information G, which is calculated in advance based on a mounting position and a mounting angle of the imaging device 21 to the vehicle C, an angle of view of the imaging device 21, and so on.

For example, the image recognizing section 6 may perform the image recognition processing of the lane markings (various lane markings such as solid lines 40, dashed lines 41, lane markings with zebra zones, and lane markings with deceleration zones) included in the image information G by using the feature information F included in the road information H obtained by the road information obtaining section 4. Specifically, the feature information F regarding the lane markings in the vicinity of the vehicle position may be used. Then, the image recognizing section 6 may output the image recognition results regarding such lane markings to the lane determining section 7.

The lane determining section 7 determines the road lane in which the vehicle C is traveling based on the image recognition results by the image recognizing section 6, the vehicle position information S obtained by the vehicle position information obtaining section 3, and the road information H obtained by the road information obtaining section 4. In this example, the lane determining section 7 may include a first lane determining part 7a and a second lane determining part 7b. The lane determining section 7 may output the vehicle lane information R as its determination result to the vehicle position information obtaining section 3. Consequently, the navigation apparatus 1 is capable of obtaining the vehicle lane information R, and through the navigation computing section 8 and so on, it is capable of performing navigation operations such as road guidance and route search by referring to the vehicle lane information R.

Specifically, based on the image recognition results, the vehicle position information S, and the road information H, the lane determining section 7 may detect whether an area where it is highly likely that the vehicle lane cannot be determined exists in the forward direction of the vehicle C. The area where it is highly likely that the vehicle lane cannot be determined may be an area where a branch point (especially, a narrow-angle branch point) exists and the lane markings do not exist at all or do not partly exist before the branch point. Area A shown in FIG. 6 is an example of such an area.

In areas other than areas where it is highly likely that the vehicle lane cannot be determined, the first lane determining part 7a performs first vehicle lane determination by using the lane markings according to a conventional method to determine the lane where the vehicle C is traveling. On the other hand, in an area where a branch point (especially, a narrow-angle branch point) exists and the lane markings do not exist at all or do not partly exist before the branch point, the vehicle lane where the vehicle C is traveling cannot be determined by the first vehicle lane determination. Therefore, the second lane determining part 7b performs second vehicle lane determination by using the specific lane markings after the vehicle C passes through such an area (e.g., area A), to determine the vehicle lane where the vehicle C is traveling.

Hereinafter, processing in the first lane determining part 7a and the second lane determining part 7b included in the lane determining section 7 will be described in detail with reference to FIGS. 3-10.

The first lane determining part 7a performs the first vehicle lane determination when an area in which it is highly likely that the vehicle lane cannot be determined (for example, the area A in FIG. 6) does not exist in the forward direction of the vehicle C. That is, if a branch point does not exist or if all of lane markings are imaged in the vicinity of a branch point if any, the first vehicle lane determination is performed by using the lane markings such as the solid lines 40 or the dashed lines 41 existing on both sides of the lane. In this example, the first lane determining part 7a performs the vehicle lane determination based on the image recognition results of the lane markings (white lines such as the solid lines 40 or the dashed lines 41) by the image recognizing section 6 and the feature information F of the lane markings in the vicinity of the vehicle C, which information is included in the road information H obtained by the road information obtaining section 4.

Figure 7:
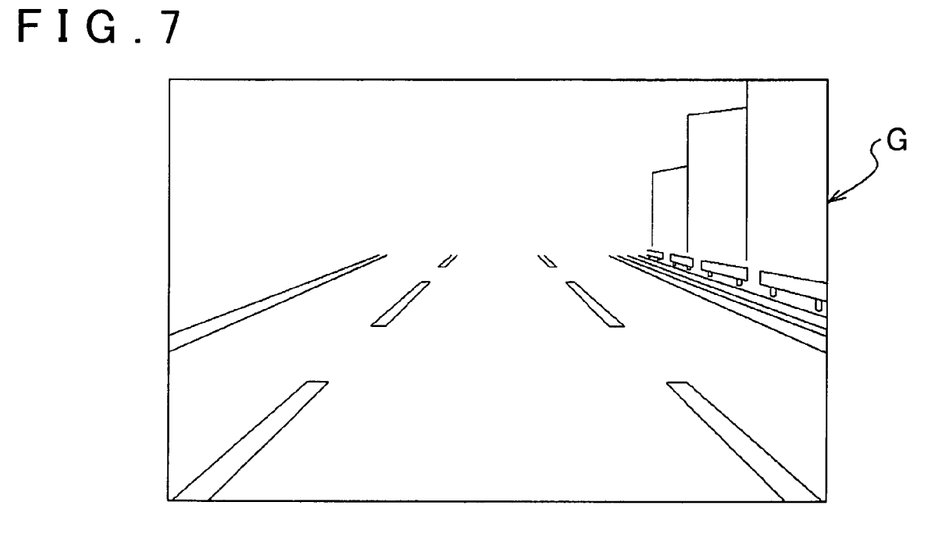
FIG. 7 is a view showing exemplary image information of an area behind the vehicle.
Figure 8:
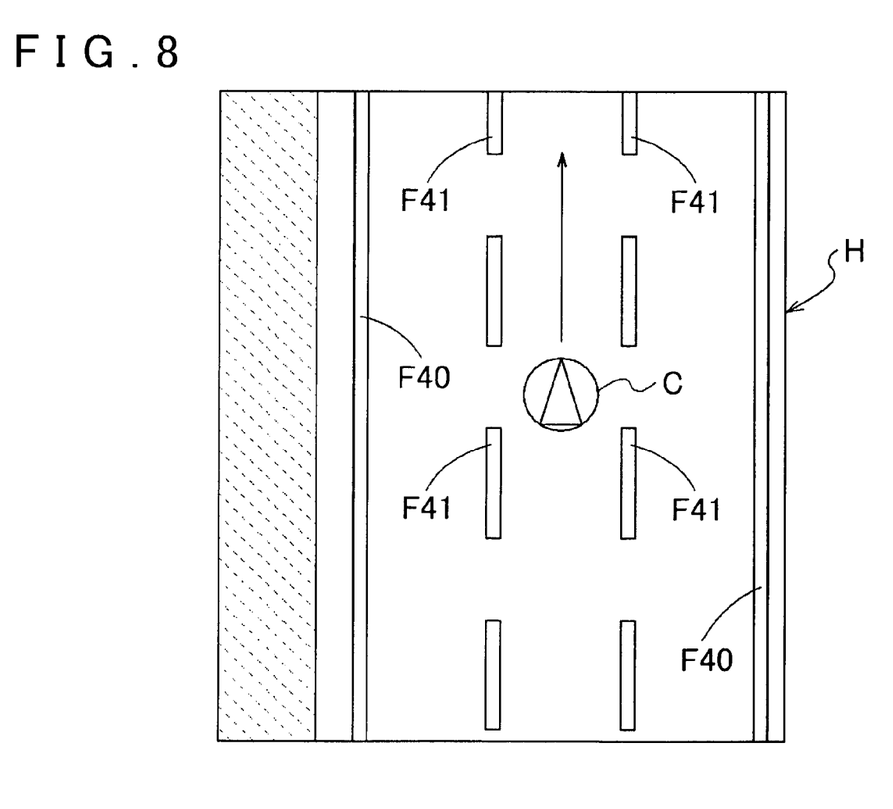
FIG. 8 is a view showing exemplary road information including feature information of features around the vehicle.

As an example, a description will be given of a case where the first lane determining part 7a performs the vehicle lane determination based on the image information G shown in FIG. 7 and the road information H shown in FIG. 8. Specifically, the first lane determining part 7a specifies the lane on which the vehicle C is traveling, based on the type of the lane markings in the vicinity of the vehicle C and the positional relation between each of the lane markings and the vehicle C (which are included in the image recognition results by the image recognition section 6), and the feature information F on the lane markings included in the road information H regarding the vicinity of the vehicle position. For example, the dashed lines 41 as the lane markings continuously appear on both sides of the vehicle C as shown in FIG. 7 in the obtained image information G. In the obtained road information H regarding the vicinity of the vehicle C, a three-lane road is shown and among four lane markings, the outermost two lines are solid lines F40 and the central two lines are dashed lines F41 as shown in FIG. 8. From this information, it can be determined that a lane where the vehicle C is traveling is the center lane among the three lanes.

That is, in the image shown in the image information G (see FIG. 7), the dashed lines 41 exist on both sides of a widthwise image center which is the position of the vehicle C. On both outer sides of the dashed lines 41, the solid lines 40 exist respectively. As is seen from the road information H (see FIG. 8), the road where the vehicle C is traveling has three lanes, and pieces of the feature information F of the solid lines F40 as the lane markings exist on both sides of the road and pieces of the feature information F of the two dashed lines F41 as the lane markings demarcating the lanes exist on the center portion of the road. Therefore, the first lane determining part 7a can determine that the lane where the vehicle C exists is the center lane among the three lanes, by comparing these pieces of information. The first lane determining part 7a further determines whether the vehicle C has changed lanes, according to whether the vehicle C has crossed the lane marking, based on the position information regarding the lane markings which is included in the image recognition results by the image recognizing section 6.

The second lane determining part 7b performs the second vehicle lane determination (imaging order-based lane determination) if an area in which it is highly likely that the vehicle lane cannot be determined exists in the forward direction of the vehicle C. For example, in the forward direction of the vehicle C, there is sometimes an area such as the area A in FIG. 6 in which a branch point (especially, a narrow-angle branch point) exists and the solid lines 40 or the dashed lines 41 as the lane markings do not exist at all or do not partly exist before the branch point. In such an area, the vehicle lane determination cannot be performed. Therefore, in this example, the second lane determining part 7b performs the vehicle lane determination based on the image recognition results by the image recognizing section 6 regarding the specific lane markings (the lane markings with the zebra zones 44, the lane markings with the deceleration zones 45, and the like), and the feature information F regarding the specific lane markings in the vicinity of the vehicle C (included in the road information H obtained by the road information obtaining section 4).

Specifically, first, candidates for a vehicle lane on which the vehicle C may travel after passing through the branch point are limited to the vehicle lane itself indicated by vehicle lane information R1 which is obtained before the vehicle lane determination by the first lane determining part 7a becomes impossible, and a lane adjacent to this vehicle lane. Consequently, a lane that is unlikely to become the vehicle lane can be excluded from the candidates, thereby realizing increased accuracy of the imaging order-based lane determination. Then, the second lane determining part 7b performs the lane determination based on the feature information F regarding the specific lane markings of the limited vehicle lanes, and the image recognition results of the specific lane markings included in the image information G. Here, the presence/absence of the specific lane markings in the vicinity of the vehicle C, the imaging order of the specific lane markings, the types of the specific lane markings, and the positional relations between the specific lane markings and the vehicle C have been known from the image recognition results. Therefore, based on the image recognition results, the second lane determining part 7b is capable of specifying the vehicle lane that the vehicle C chooses after passing through the branch point, and outputting vehicle lane information R2.

A specific example of the second vehicle lane determination processing by the second lane determining part 7b will be described in detail based on FIG. 6. FIG. 6 is a view showing an example of a narrow-angle branch point where the lane markings with the zebra zones 44 as the specific lane markings are provided. FIG. 6 shows an example where the vehicle C passes through the point Y from the point X of a four-lane road to advance to a point Z. In a state where the vehicle C is at the point X, the second lane determining part 7b detects, based on the road information H, that the narrow-angle branch point exists in a forward direction d and the lane markings such as the solid lines 40 and the dashed lines 41 do not exist at all or do not partly exist before the narrow-angle branch point (detects the area A). Therefore, the second lane determining part 7b starts the second vehicle lane determination (imaging order-based lane determination).

By using the vehicle lane information R1 which is obtained by the first vehicle lane determination before the vehicle C reaches the vicinity of the X point, the candidates for a vehicle lane that the vehicle C may choose after passing through the narrow-angle branch point are limited to lanes d1, d2, d3 to which the vehicle C can advance along the lane itself in the d direction and its adjacent lanes. Further, the second lane determining part 7b detects whether any lane marking with the zebra zone 44 is recognized in the image recognition results which are obtained based on pieces of the image information G sequentially imaged by the back camera of the vehicle C. If any lane marking with the zebra zone 44 is recognized, the second lane determining part 7b detects on which of the right and left of the vehicle C such a lane marking is recognized. If a plurality of the specific lane markings such as the lane markings with the zebra zones 44 are recognized, the second lane determining part 7b detects in which order the plural lane markings with the zebra zones 44 are recognized. Then, the second lane determining part 7b compares these detection results and the information on the positions and forms of the lane markings with the zebra zones 44 provided in the vicinity of the lanes d1, d2, d3, based on the information included in the road information H (see FIGS. 5 and 6).

For example, while the vehicle C is advancing in the d direction in FIG. 6, the lane marking with the zebra zone 44 is first detected on the right of the vehicle C (the left side in the image information G in FIG. 3) and subsequently the lane marking with the zebra zone 44 is detected on the left of the vehicle C (on the right in the image information G in FIG. 4). Thus, it can be determined that the vehicle C is traveling on the lane in the d2 direction. Similarly, if the lane marking with the zebra zone 44 is first detected on the left of the vehicle C (on the right in the image information G) and subsequently the lane marking with the zebra zone 44 is detected on the right of the vehicle C (on the left in the image information G), it can be determined that the vehicle C is traveling on the lane in the d1 direction. If, in the image information G, the lane marking with the zebra zone 44 is first detected on the left of the vehicle C (on the right in the image information G) and no lane marking with the zebra zone 44 is thereafter detected, it can be determined that the vehicle C is traveling on the lane in the d3 direction.

Therefore, the vehicle lane can be determined based on the imaging order of the lane markings with the zebra zones 44, the positions of the imaged lane markings with the zebra zones 44 relative to the vehicle C, the forms of the imaged lane markings with the zebra zones 44, and the road information H regarding the lane markings with the zebra zones 44. Therefore, even if the narrow-angle branch point exists in the forward direction d and the vehicle lane determination is difficult due to the absence of the solid lines 40 or the dashed lines 41, quick vehicle lane determination is possible.

The navigation computing section 8 is a processing unit operating according to an application program 8a in order to execute navigation functions such as vehicle position display, route search from a place of departure to a destination, course guidance to the destination, and destination search. For example, the navigation computing section 8 may perform processing such as obtaining the map information M regarding the vicinity of the vehicle C which is obtained from the map database 20 by the road information obtaining section 4, and then displaying an image of a map on a display unit 25 and displaying a vehicle position mark on the image of the map in an overlaid manner, based on the vehicle position information S. Further, the navigation computing section 8 may perform course guidance by using one of or both of the display unit 25 and an audio output device 26 based on a departure-to-destination route calculated by a generally known method and the vehicle position information S.

The application program 8*a* refers to the vehicle lane information R determined by the lane determining section 7 to perform the navigation operations such as the vehicle position display, the route search, and the course guidance. Specifically, for example, the application program 8*a* may perform operations such as displaying the determined vehicle lane on the display unit 25 and stopping the course guidance necessitating impossible lane change according to the determined vehicle lane. Therefore, in this example, the navigation computing section 8, the display unit 25, and the audio output device 26 may function as a guidance information output section 27. Note that the navigation computing section 8 may be connected not only to these components but also to various known components usable with a navigation apparatus, such as a remote controller, a user interface such as a touch panel integrally provided with the display unit 25, and so on, which are not shown.

Next, an exemplary lane determining method will be described with reference to FIGS. 9 and 10. The exemplary method may be implemented, for example, by one or more components of the above-described navigation apparatus 1. However, even though the exemplary structure of the above-described navigation apparatus 1 may be referenced in the description, it should be appreciated that the structure is exemplary and the exemplary method need not be limited by any of the above-described exemplary structure.

Figure 9:
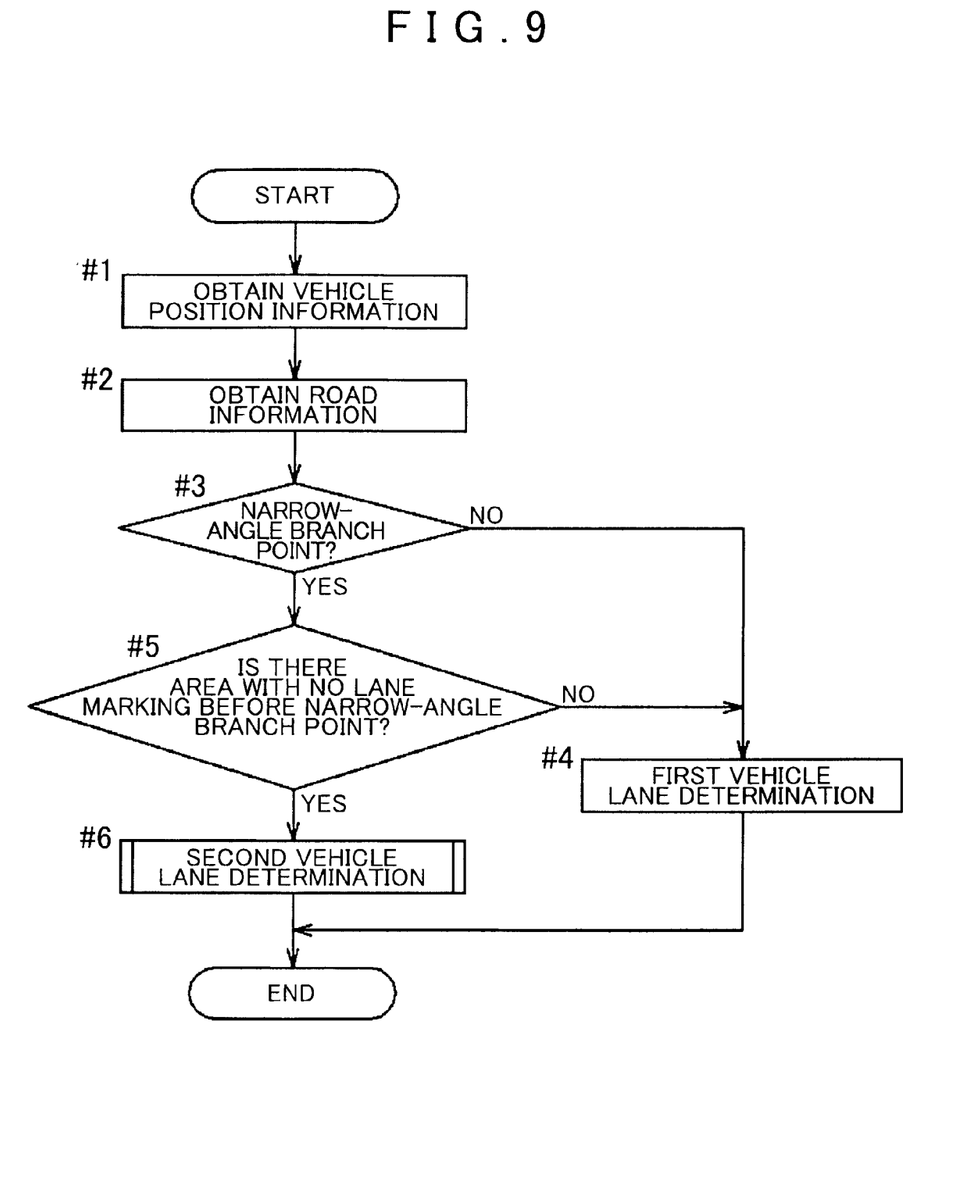
FIG. 9 is a flowchart showing an exemplary lane determining method.

As shown in FIG. 9, in the navigation apparatus 1, the vehicle position information obtaining section 3 first obtains the vehicle position information S obtained from the GPS receiver 22 and so on (Step #01). Next, the road information H regarding an area within a predetermined distance in the forward direction d of the vehicle C is obtained from the map database 20 based on the vehicle position information S (Step #02). The obtained road information H includes the information on the position and form of each lane marking. Then, it is detected, based on the road information H, whether or not there is a narrow-angle branch point within the predetermined distance (Step #03).

If it is determined, based on, for example, the information on the link angle of two links included in the road information H, that there is no narrow-angle branch point (Step #03: NO), the first vehicle lane determination is executed (Step #04). On the other hand, if there is a narrow-angle branch point within the predetermined distance (Step #03: YES), it is detected whether there is an area (for example, the area A) with no lane markings (the solid lines 40 and the dashed lines 41) or without part of the lane markings before the narrow-angle branch point (Step #05). If there is no such an area (Step #05: NO), the first vehicle lane determination is executed (Step #04). On the other hand, if there is an area with no lane markings or without part of the lane markings before the narrow-angle branch point (Step #05: YES), the second vehicle lane determination is executed (Step #06).

Figure 10:
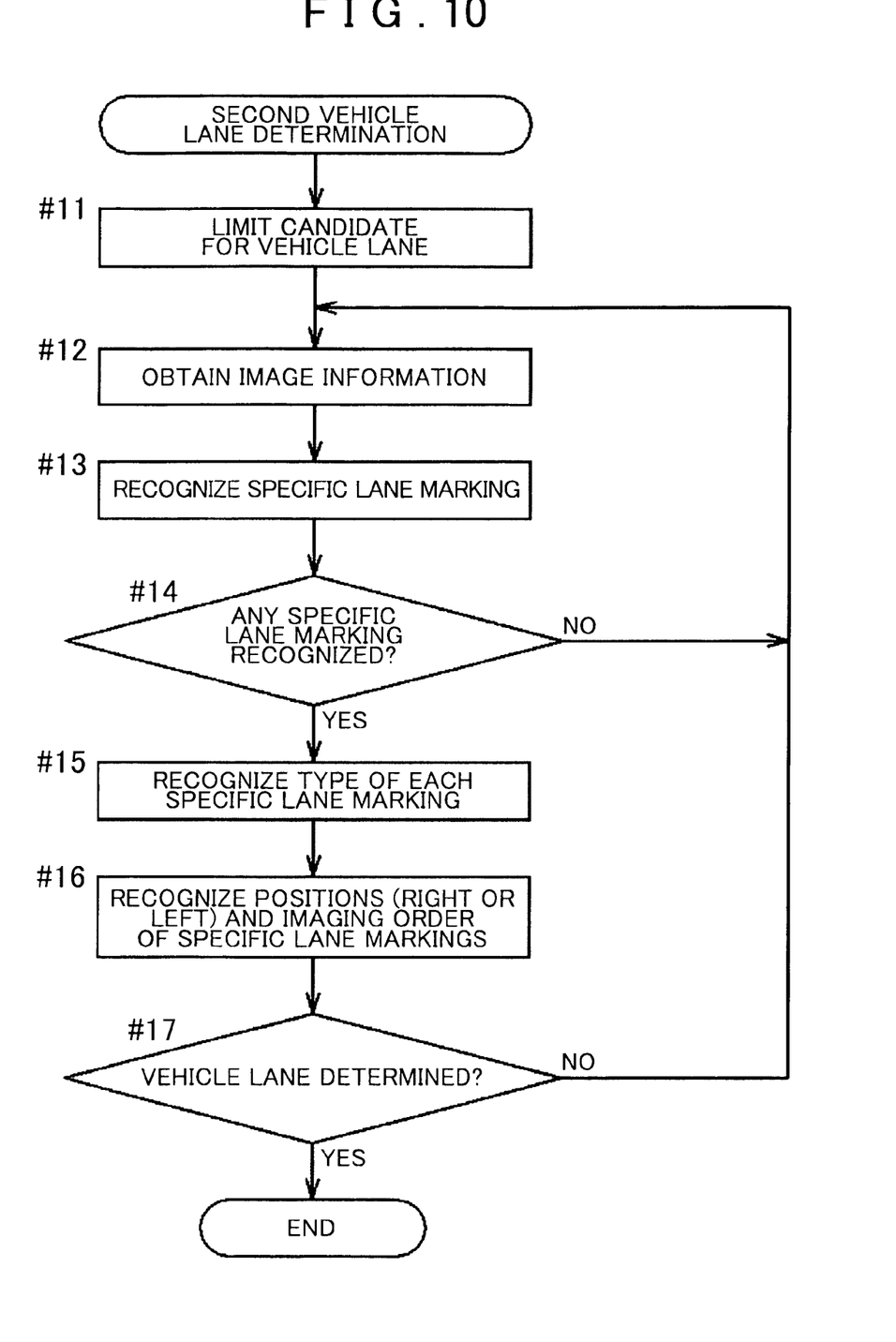
FIG. 10 is a flowchart showing an exemplary lane determining method.

Next, the second vehicle lane determination (Step #06) will be descried with reference to FIG. 10. As shown in FIG. 10, in the second vehicle lane determination, the navigation apparatus 1 first limits the candidates for a vehicle lane that the vehicle C may choose after passing through the narrow-angle branch point, based on the vehicle lane information R1 (obtained before the vehicle lane determination by the first lane determination part 7*a* becomes impossible) (Step #11). Consequently, a lane that is unlikely to become the vehicle lane can be excluded from the candidates, which can realize increased accuracy of the imaging order-based lane determination.

Then, the image information obtaining section 5 obtains the image information G of at least the lane markings imaged in the vicinity of the vehicle C (Step #12). Next, it is recognized whether any specific lane marking (e.g., the lane marking with the zebra zone 44, the lane marking with the deceleration zone 45, or the like) is imaged in this image information G (Step #13). If no specific lane marking is recognized (Step #14: NO), the processing returns to Step #12, where the image information G is obtained. Therefore, the image information G is continuously obtained until the specific lane marking is recognized.

On the other hand, if any specific lane marking is recognized (Step #14: YES), the type of the specific lane marking is recognized (Step #15), and further the position of this specific lane marking is recognized, and if any other specific lane marking is recognized, the imaging order of the first recognized specific marking and the other specific lane marking is recognized (Step #16). Consequently, the form of the specific lane markings in the image information G, the positional relation of the specific lane markings relative to the vehicle C (on which of the right and left of the vehicle C, each of the specific lane markings is detected), and the imaging order of the specific lane markings can be recognized. Then, by comparing these recognition results with the road information H, it is determined whether the lane on which the vehicle C is traveling after passing through the narrow-angle branch point has been determined (Step #17). If the vehicle lane has not been determined (Step #17: NO), the processing goes to Step #12, where the image information G is obtained, and the second vehicle lane determination is continued. On the other hand, if the vehicle lane has been determined (Step #17: YES), the second vehicle lane determination is ended, and thus, the lane determination method (FIG. 9) is ended.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

Figure 11:
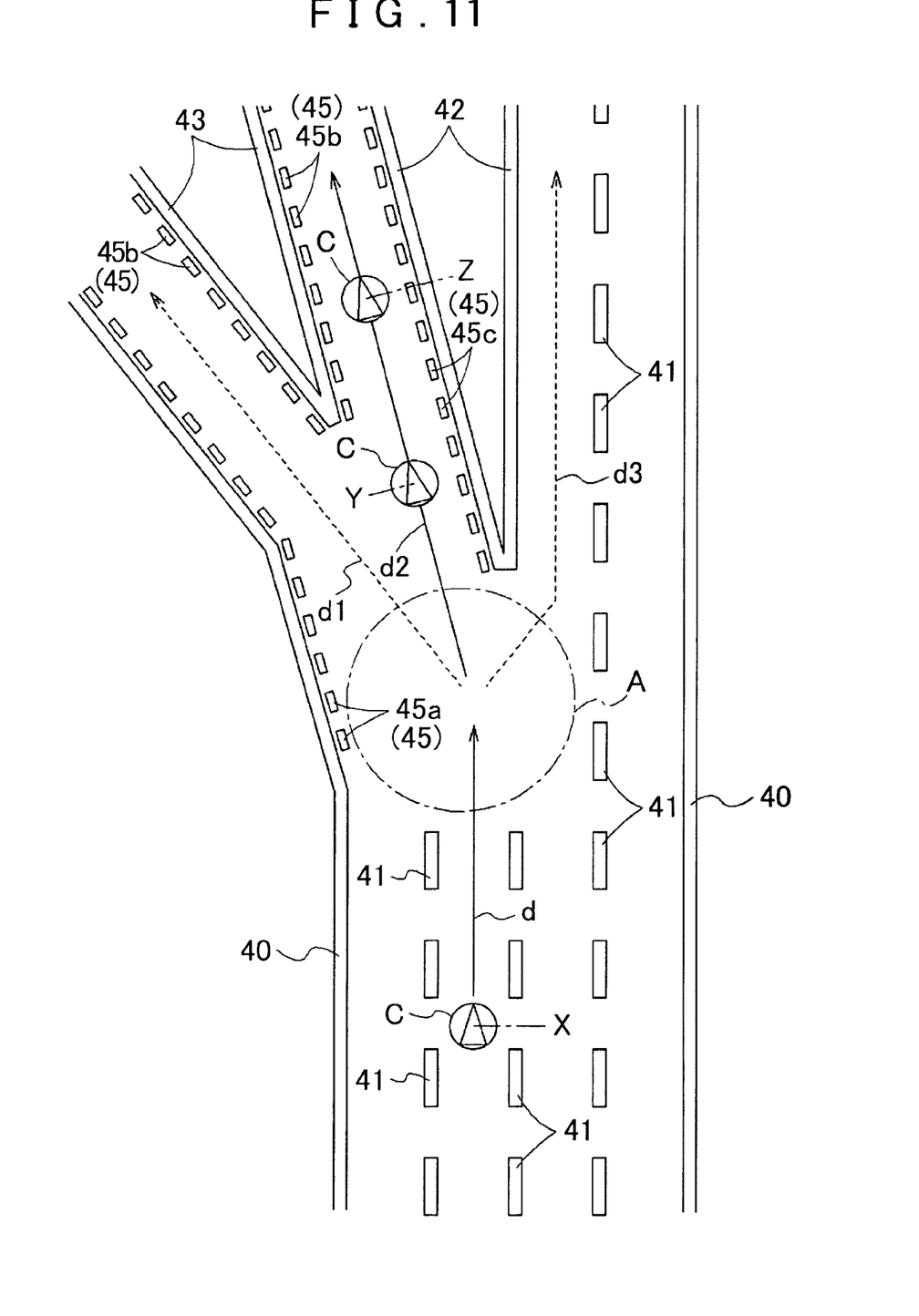
FIG. 11 is a view showing an example of a narrow-angle branch point where lane markings with deceleration zones are provided.

For example, in the above-described example, the case where the specific lane marking is mainly the lane marking with the zebra zone 44 is described based on FIG. 6. However, for example, a lane marking with the deceleration zone 45 as shown in FIG. 11 may also be used. The lane marking with the deceleration zone 45 also has a characteristic shape and thus its image recognition is easy performed. In this case, the lane marking with the zebra zone 44 in the description using FIG. 3 to FIG. 10 is replaced by the lane marking with the deceleration zone 45. Consequently, even when the vehicle lane determination is difficult because there is a narrow-angle branch point in the forward direction d and the lane markings do not exist at all or do not partly exist, quick vehicle lane determination is possible by using the lane markings with the deceleration zones 45 in a similar manner to using the lane markings with the zebra zones 44. It should be noted that the specific lane markings are not particularly limited, but may be any other lane markings, provided that they exist ahead of the branch point and have a characteristic shape, and their imaging order, positional relations relative to the vehicle C, and forms can be specified from the image recognition.

In the above example, the case where the first lane determining part 7*a* determines the vehicle lane on the road where the vehicle C is traveling, based on the results of the image recognition of the image information G. However, the vehicle lane determining method by the first lane determining part 7*a* is not limited to this. For example, besides the vehicle lane determining method described above, a structure where the first lane determining part 7a performs the vehicle lane determination based on information from VICS® (Vehicle Information and Communication System), based on information from an optical beacon or the like sent from a transmitter provided on each lane of a road is also possible.

In the above-described example, the second lane determining part 7b performs the vehicle lane determination after limiting the candidates for the vehicle lane on which the vehicle C may travel after passing through the narrow-angle branch point. However, a structure in which the second lane determining section 7b performs the vehicle lane determination without limiting the candidates for the vehicle lane is also possible.

According to the present invention, in determining a lane on which a vehicle is traveling, by using image recognition results of lane markings, it is possible to quickly determine the lane on which the vehicle travels after passing through a branch point of a road even if no lane marking (solid or dashed white lines) as a basis of the recognition of the lane exists before the branch point. Accordingly, it is possible to provide a lane determining device and a lane determining method usable for a navigation apparatus and the like, that can accurately recognize the position of the vehicle immediately after the vehicle passes through the narrow-angle branch point.

What is claimed is:

1. A lane determining device, comprising:
    a memory that stores road information including positions and forms of a first lane marking including a zebra zone and a deceleration zone and a second lane marking including solid lines or dashed lines existing on both sides of a lane;
    an imaging device that captures an image of the first lane marking and the second lane marking; and
    a controller configured to:
    obtain vehicle position information indicating a current position of a vehicle;
    based on the vehicle position information, access the stored road information including the positions and the forms of the lane markings around the current position of the vehicle;
    based on the accessed road information and without using the captured image, determine whether a branch point exists on the road in a forward direction of the vehicle;
    based on the accessed road information and without using the captured image, detects that the second lane marking does not exist at all before the branch point; wherein,
    if it is determined that the branch point does not exist on the road in the forward direction of the vehicle or it is detected that the second lane marking exists at all before the branch point, the controller:
    obtains image information of the captured image of the second lane marking; and
    determines a lane in which the vehicle is traveling based on the second lane marking in the image information and the road information, and
    if it is determined that the branch point exists on the road in the forward direction of the vehicle and it is detected that second lane marking does not exist at all before the branch point, the controller:
    obtains image information of the branch point including the captured image of the first lane marking; and
    determines a lane in which the vehicle is traveling after the branch point based on an imaging order of the first lane marking, a form of the first lane marking, a position of the first lane marking in the image information of the branch point, and the road information.

2. The lane determining device according to claim 1, wherein the branch point is a narrow-angle branch point.

3. The lane determining device according to claim 1, wherein the controller specifies a position of the first lane marking in the image information of the branch point as on a right side of the vehicle or on a left side of the vehicle.

4. The lane determining device according to claim 1, wherein the controller:
    obtains image information of an area before the branch point including a captured image of a second lane marking;
    recognizes the image of the second lane marking included in the image information of the area before the branch point;
    compares the recognized image of the second lane marking with the road information; and
    based on a result of the comparison, determines a lane in which the vehicle is traveling prior to the branch point.

5. The lane determining device according to claim 4, wherein the controller defines a lane adjacent to the lane in which the vehicle is traveling prior to the branch point as a candidate for the lane in which the vehicle is traveling after the branch point.

6. A navigation apparatus comprising:
    the lane determining device according to claim 1; and
    a map database storing map information including the road information;
    wherein the controller outputs guidance information based on the map information and the lane in which the vehicle is traveling after the branch point.

7. A lane determining method comprising:
    causing an imaging device to capture an image of a first lane marking and a second lane marking;
    obtaining vehicle position information indicating a current position of a vehicle;
    based on the vehicle position information, accessing stored road information including positions and forms of the first including a zebra zone and a deceleration zone and a second lane marking including solid lines or dashed lines existing on both sides of a lane around the current position of the vehicle;
    based on the accessed road information and without using the captured image, determining whether a branch point exists on the road in a forward direction of the vehicle;
    based on the accessed road information and without using the captured image, detecting that the second lane marking does not exist at all before the branch point;
    if it is determined that the branch point does not exist on the road in the forward direction of the vehicle or if it is detected that the second lane marking exists at all before the branch point:
    obtaining image information of the captured image of the second lane marking; and
    determining a lane in which the vehicle is traveling based on the second lane marking in the image information and the road information; and
    if it is determined that the branch point exists on the road in the forward direction of the vehicle and it is detected that the second lane marking does not exist at all before the branch point:
    obtaining image information of the branch point including the captured image of the first lane marking; and
    determining a lane in which the vehicle is traveling after the branch point based on an imaging order of the first lane marking, a form of the first lane marking, a position of the first lane marking in the image information of the branch point, and the road information.

8. The lane determining method according to claim 7, wherein the branch point is a narrow-angle branch point.

9. The lane determining method according to claim 7, further comprising specifying a position of the first lane marking in the image information of the branch point as on a right side of the vehicle or on a left side of the vehicle.

10. The lane determining method according to claim 7, further comprising:
- obtaining image information of an area before the branch point including a captured image of a second lane marking;
- recognizing the image of the second lane marking included in the image information of the area before the branch point;
- comparing the recognized image of the second lane marking with the road information; and
- based on a result of the comparison, determining a lane in which the vehicle is traveling prior to the branch point.

11. The lane determining method according to claim 10, further comprising defining a lane adjacent to the lane in which the vehicle is traveling prior to the branch point as a candidate for the lane in which the vehicle is traveling after the branch point.

12. A navigation method comprising:
- the lane determining method according to claim 7;
- storing map information including the road information; and
- outputting guidance information based on the map information and the lane in which the vehicle is traveling after the branch point.

13. A non-transitory computer-readable storage medium storing a computer-executable program usable to determine a lane, the program comprising:
- instructions for causing an imaging device to capture an image of a first lane marking and a second lane marking;
- instructions for obtaining vehicle position information indicating a current position of a vehicle;
- instructions for accessing, based on the vehicle position information, stored road information including positions and forms of the first lane marking including a zebra zone and a deceleration zone and a second lane marking including solid lines or dashed lines existing on both sides of a lane around the current position of the vehicle;
- instructions for determining, based on the accessed road information and without using the captured image, whether a branch point exists on the road in a forward direction of the vehicle;
- instructions for detecting, based on the accessed road information and without using the captured image, that the second lane marking does not exist at all before the branch point;
- instructions for, if it is determined that the branch point does not exist on the road in the forward direction of the vehicle or if it is detected that the second lane marking exists at all before the branch point:
 - obtaining image information of the captured image of the second lane marking; and
 - determining a lane in which the vehicle is traveling based on the second lane marking in the image information and the road information; and
- instructions for, if it is determined that the branch point exists on the road in the forward direction of the vehicle and it is detected that the second lane marking does not exist at all before the branch point:
 - obtaining image information of the branch point including the captured image of the lane marking; and
 - determining a lane in which the vehicle is traveling after the branch point based on an imaging order of the lane marking, a form of the lane marking, a position of the lane marking in the image information of the branch point, and the road information.

* * * * *